Sept. 11, 1956
R. E. LENZ
2,762,850
VINYL CHLORIDE PRODUCTION
Filed Sept. 6, 1951
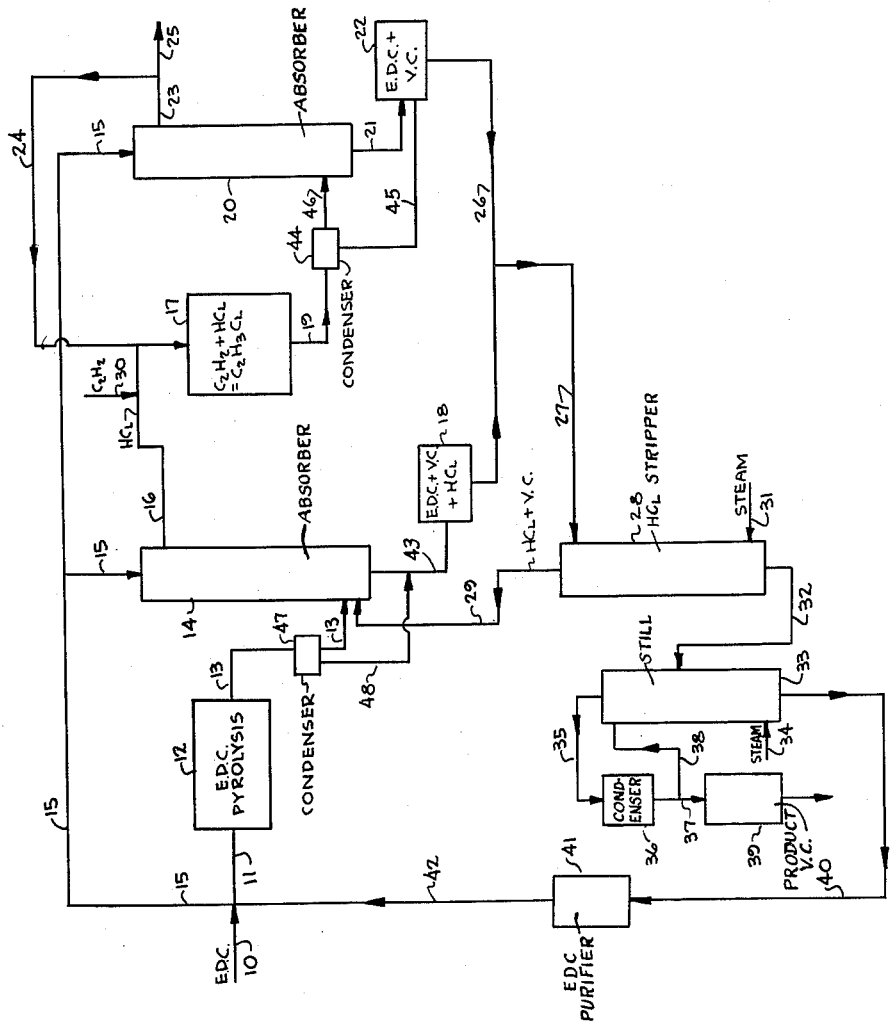
INVENTOR.
ROBERT E. LENZ
BY
*ATTORNEY*

United States Patent Office 2,762,850
Patented Sept. 11, 1956

2,762,850

VINYL CHLORIDE PRODUCTION

Robert E. Lenz, Richmond Heights, Mo., assignor to Monsanto Chemical Company, St. Louis, Mo., a corporation of Delaware Application September 6, 1951, Serial No. 245,330

2 Claims. (Cl. 260—656)

This invention relates to an improvement in the process for producing vinyl chloride.

According to the present invention, 1,2-dichlorethane, also referred to herein as ethylene dichloride, is pyrolytically decomposed into a pyrolysis product comprising vinyl chloride and hydrogen chloride, the pyrolysis product is scrubbed with ethylene dichloride so as to separate hydrogen chloride from the said pyrolysis product and to form a first solution of ethylene dichloride containing vinyl chloride dissolved therein. Acetylene is mixed with the hydrogen chloride of the pyrolysis product and the mixture subjected to catalytic hydrochlorination of the acetylene to form a gaseous mixture containing vinyl chloride, the said gaseous mixture is then scrubbed with another portion of the ethylene dichloride to form a second solution containing vinyl chloride, the first-formed ethylene dichloride solution is combined with the second-formed solution and fractionally distilled to separate and recover vinyl chloride from said combined solution.

By reason of the fact that the first-formed ethylene dichloride solution contains some dissolved hydrogen chloride in addition to the vinyl chloride, the fractionation of the combined solution will result in the recovery of a vinyl chloride containing the hydrogen chloride so dissolved in the solution. Such hydrogen chloride may be removed by washing with an alkaline solution and the vinyl chloride thereafter recovered in pure form. Such a purification, however, results in an economic waste of hydrogen chloride.

I have furthermore discovered that the hydrogen chloride contained in the ethylene dichloride solution may be fractionally distilled therefrom and combined with the hydrogen chloride supplied to the acetylene hydrochlorination step. In this way, the hydrogen chloride ordinarily wasted is recovered and used for combination with acetylene to form additional vinyl chloride.

It has already been proposed to produce vinyl chloride by employing the hydrogen chloride obtained from the ethylene dichloride pyrolysis reaction for use in the acetylene hydrochlorination reaction. According to these prior proposals the acetylene hydrochlorination reaction was carried out by the addition of acetylene to the pyrolysis products and the resulting mixture then subjected to catalytic hydrochlorination on a suitable catalyst. Such a method of operation requires the employment of a considerably larger catalytic apparatus and a larger quantity of catalyst and also by reason of the presence of a substantial amount of vinyl chloride in the synthesis gases increases substantially the volatilization of the mercuric chloride from the catalyst.

I have now found that the pyrolytic decomposition of ethylene dichloride yielding vinyl chloride and hydrogen chloride may be combined with the acetylene hydrochlorination process in a novel manner so as to avoid the presence of large volumes of substantially inert gases over the acetylene hydrochlorination catalyst and yet retain the advantages offered by the use of the hydrogen chloride obtained in this manner. This advantage is obtained by scrubbing the vinyl chloride-containing gases from the pyrolytic process, as well as the vinyl chloride-containing gases from the acetylene hydrochlorination process with ethylene dichloride, combining the two scrubbing solutions and then in a single operation stripping the solution of contained hydrogen chloride and recovering vinyl chloride in a pure form by simple fractionation therefrom. This recovered hydrogen chloride is combined with the hydrogen chloride resulting from the ethylene dichloride pyrolysis for further use in the acetylene hydrochlorination step.

The invention is illustrated by the accompanying drawing, wherein is shown a diagrammatic flow sheet suitable for carrying out the present invention.

Referring to the drawing, numeral 10 indicates a source of 1,2-dichlorethane, designated therein as EDC. Numeral 11 indicates a pipe line for supplying the said ethylene dichloride to pyrolysis unit 12. The pyrolysis products produced in 12 are passed by line 13 into a fractional condenser 47 where the unpyrolyzed ethylene dichloride is condensed together with a portion of the vinyl chloride, which condensate flows along line 48 and combined in tank 18 with the liquid from absorber 14. Vinyl chloride is designated therein as VC. The uncondensed material from condenser 47 comprising hydrogen chloride and vinyl chloride is conveyed by pipe 13 and introduced into absorber 14. In this absorber 14 the gases are contacted with cold ethylene dichloride supplied thereto by pipe 15, which in turn is supplied from ethylene dichloride source 10. In the absorber the ethylene dichloride dissolves substantially all of the uncondensed vinyl chloride. Hydrogen chloride, however, is dissolved only to a minor extent in the ethylene dichloride, the major portion of the hydrogen chloride passing out of absorber 14 by pipe 16. The liquid ethylene dichloride now containing vinyl chloride and a small quantity of hydrogen chloride leaves absorber 14 by pipe 43 and is collected in storage vessel 18.

Returning now to the hydrogen chloride in pipe 16, it will be noted that this said pipe 16 conveys the hydrogen chloride to acetylene hydrochlorination reactor 17. During its conveyance it is mixed with the appropriate quantity of acetylene supplied thereto by means of pipe 30. The products of hydrochlorination leave reactor 17 by line 19 and enter condenser 44. Here the major proportion of contained vinyl chloride is condensed and flows to tank 22 by pipe 45. The uncondensed portion of the product flows through pipe 46 to absorber 20. Absorber 20 is supplied with a stream of ethylene dichloride by pipe 15 and the vinyl chloride in the uncondensed gases is dissolved therein. The resulting ethylene dichloride solution flows out by pipe 21, entering tank 22. The composition of the contents of tank 22 is approximately as follows:

| | Percent |
|---|---|
| Ethylene dichloride | 42.0 |
| Vinyl chloride | 56.0 |
| Inerts | Balance |

The gases unabsorbed by the ethylene dichloride in absorber 20 and consisting of a mixture of acetylene and inert gases leave by pipe 23 and are divided, part returning to reactor 17 by pipe 24 and part being purged to the atmosphere at 25. By means of such purge the concentration of inert gases present in the system can be maintained at the desired level.

Returning now to the ethylene dichloride solution of vinyl chloride contained in storage tanks 18 and 22, pipe 26 is provided connecting these tanks and permits the contents of the tanks to be combined. The combined solution flows from pipe 26 into pipe 27 and thence to hydrogen chloride stripper 28. In this device the downward-flowing ethylene-dichloride solution is heated sufficiently so that the hydrogen chloride present is boiled out and discharged from the stripper by pipe 29, ultimately passing through absorber 14 and thence into reactor 17.

Heat is supplied to the stripper 28 by any suitable means such as steam flowing into a closed coil at point 31. The ethylene dichloride solution from which contained hydrogen chloride has been removed flows by pipe 32 into still 33. This still is likewise heated by steam supplied at 34, whereby the contents are boiled to liberate substantially all of the dissolved vinyl chloride. The vinyl chloride thus vaporized passes out of pipe 35 and enters condenser 36, wherein it is cooled sufficiently so as to liquefy it. The liquid vinyl chloride so condensed leaves by pipe 37, a part being returned to the still as reflux by pipe 38. The remainder enters product receiver 39 from which it may be removed as desired.

The ethylene dichloride from which the vinyl chloride has been distilled flows from still 33 by pipe 40 and then to purifier 41. In purifier 41 the ethylene dichloride is distilled to separate out any high and low boiling constituents. The purified ethylene dichloride thus obtained flows by pipe 42 into pipe 11 or pipe 15 for further use in the process.

The pyrolytic decomposition of ethylene dichloride which is carried out in unit 12 is effected by heating the vapors thereof to a temperature of between 500° C. and 550° C. Approximately 50% of the ethylene dichloride is pyrolyzed to vinyl chloride and hydrogen chloride. The ethylene dichloride supplied by pipe 15 to the absorber is first cooled to a temperature of about 0° F. The pressure in absorber 14 is maintained at about 27 pounds per square inch absolute and the supply of liquid thereto is such as to raise the temperature of the final liquid to about 65° F.

The acetylene hydrochlorination reaction is preferably carried out in reactor 17 on a catalyst composed of an active carbon which has been impregnated with a mixture of mercuric chloride and cerium chloride. The method of hydrochlorination employed is described in more detail in U. S. Patent 2,446,123 to Boyd.

The absorber product obtained in tank 18 will have approximately the following composition:

| | Percent |
|---|---|
| Ethylene dichloride | 83.0 |
| Vinyl chloride | 12.0 |
| Hydrogen chloride | 2.2 |
| Tar | Balance |

Likewise absorber product obtained in tank 22 will have the following approximate composition:

| | Percent |
|---|---|
| Ethylene dichloride | 42.0 |
| Vinyl chloride | 56.0 |
| Inerts | Balance |

The solution from tanks 18 and 22 is combined in such proportions that the resulting solution contains from 18% to 22% of vinyl chloride, 84% to 88% of ethylene dichloride and 1% to 2% of hydrogen chloride together with minor amounts of tar and miscellaneous material. The solution flows to stripper 28 and heat is supplied thereto so as to raise the bottom temperature thereof to 50° C. to 55° C. and at a rate such that the overhead product leaving the still contains from 30% to 40% of hydrogen chloride, the balance thereof being substantially vinyl chloride. The overhead containing substantially all of the HCl originally contained in the stripper feed enters pipe 29 and is returned to the ethylene dichloride absorber 14.

The bottoms from the stripper consist of an ethylene dichloride solution of vinyl chloride containing from 15% to 20% of the latter together with not more than a trace of HCl. This solution flows to still 33. Here the vinyl chloride is distilled overhead, the vapors cooled to a temperature sufficiently low to liquefy the same and then collected in product receiver 39 as liquid monomeric vinyl chloride.

The bottoms from still 33 consist of ethylene dichloride containing a small amount of tar and are passed on to ethylene dichloride purifier 41, where it is subjected to fractional distillation. The purified ethylene dichloride so obtained flows by pipe 42 to the junction with pipes 11 and 15 and is then reused in the system as already described.

What I claim is:

1. The process which comprises pyrolyzing ethylene dichloride to produce a pyrolysis product comprising vinyl chloride and gaseous hydrogen chloride, scrubbing said pyrolysis product with ethylene dichloride in a first scrubbing zone to separate a major proportion of said hydrogen chloride therefrom and form a first solution containing vinyl chloride together with a minor proportion of hydrogen chloride, mixing acetylene with said gaseous hydrogen chloride and subjecting said mixture to catalytic hydrochlorination to form a gaseous mixture containing vinyl chloride, scrubbing said gaseous mixture with ethylene dichloride in a second scrubbing zone whereby said vinyl chloride is dissolved, combining said first-formed ethylene dichloride solution with said second-formed solution, subjecting said combined solution to a temperature whereby a mixture of hydrogen chloride and vinyl chloride is liberated, passing said mixture to said first scrubbing zone wherein its components are separated and fractionally distilling the remaining vinyl chloride from said combined ethylene dichloride solution.

2. The process which comprises pyrolyzing ethylene dichloride to produce a pyrolysis product comprising vinyl chloride and gaseous hydrogen chloride, scrubbing said pyrolysis product with ethylene dichloride in a first scrubbing zone to separate a major proportion of said hydrogen chloride therefrom and form a first solution containing vinyl chloride together with a minor proportion of hydrogen chloride, mixing acetylene with said gaseous hydrogen chloride and subjecting said mixture to catalytic hydrochlorination to form a gaseous mixture containing vinyl chloride, scrubbing said gaseous mixture with ethylene dichloride in a second scrubbing zone whereby said vinyl chloride is dissolved, combining said first-formed ethylene dichloride solution with said second-formed solution, subjecting said combined solution to a temperature of from 50° C. to 55° C., whereby a mixture of hydrogen chloride and vinyl chloride is liberated, passing said mixture to said first scrubbing zone wherein its components are separated, and fractionally distilling the remaining vinyl chloride from said combined ethylene dichloride solution.

References Cited in the file of this patent

UNITED STATES PATENTS 2,523,747    Weatherby            Sept. 26, 1950

FOREIGN PATENTS 573,594    Great Britain          Oct. 23, 1942